June 23, 1964 J. G. MULLER 3,138,546
APPARATUS UTILIZING SOLAR ENERGY FOR DEMINERALIZING WATER
Filed May 2, 1958 2 Sheets-Sheet 2
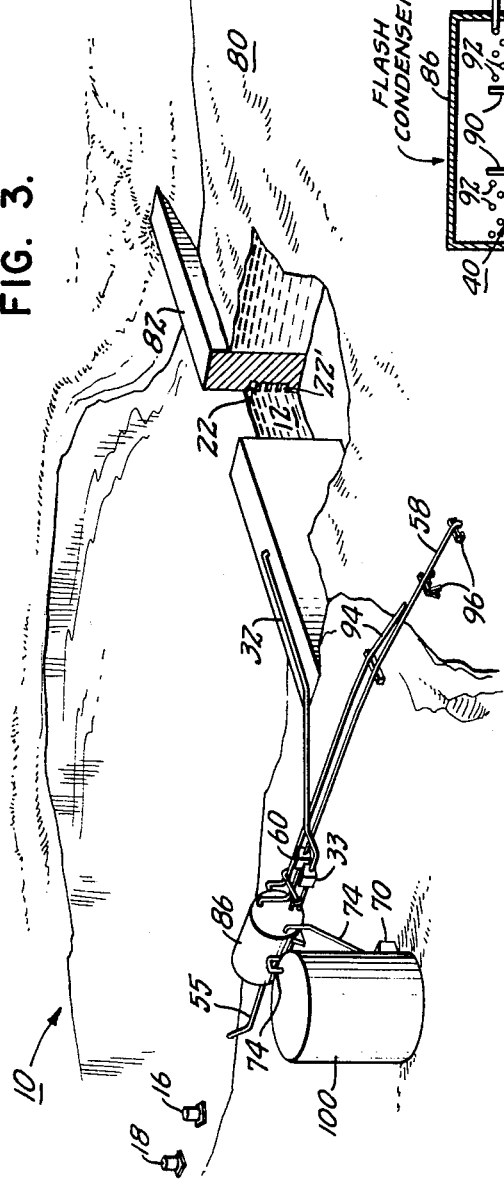
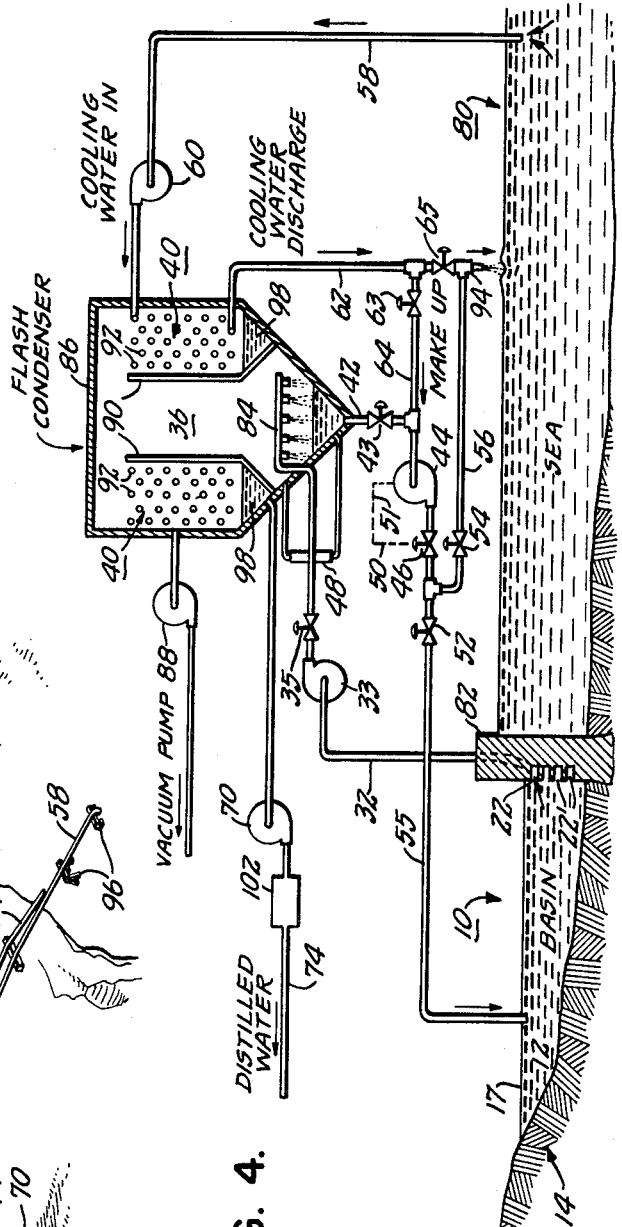
INVENTOR
JOHN G. MULLER
BY
Curtis, Morris & Safford
ATTORNEYS United States Patent Office 3,138,546
Patented June 23, 1964

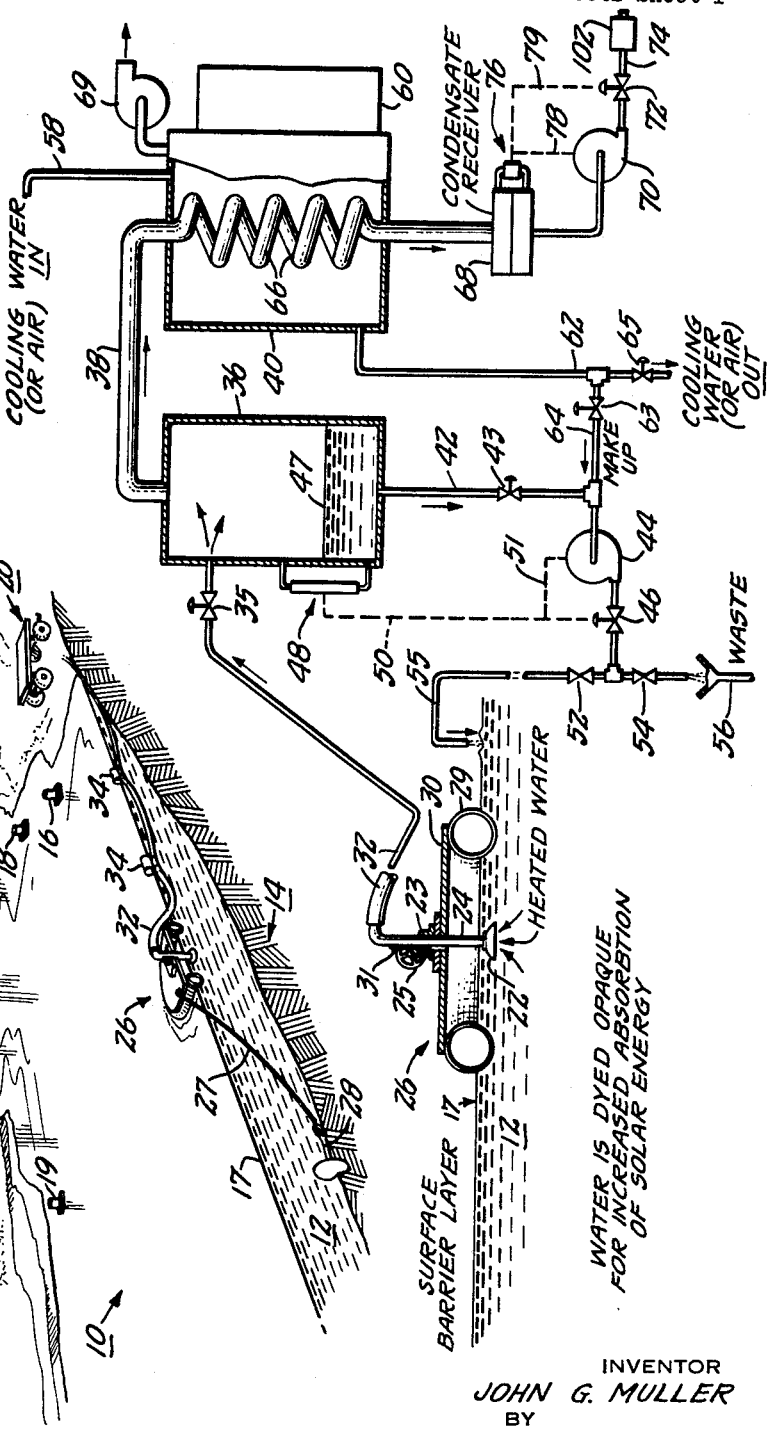

3,138,546
APPARATUS UTILIZING SOLAR ENERGY
FOR DEMINERALIZING WATER
John G. Muller, Dhahran, Saudi Arabia
(18 Edgemont Circle, Scarsdale, N.Y.)
Filed May 2, 1958, Ser. No. 732,506
4 Claims. (Cl. 202—205)

The methods and apparatus of the present invention utilize solar energy for demineralizing water in a shallow basin, such as a pond, lake, ocean inlet, or man-made depression in the earth. The water is especially treated with a dye or other coloring agent so as to act as an absorber of solar energy and is especially covered with a surface layer or barrier film of material for impeding or limiting evaporation from the surface of the water. Heated water from the basin is boiled under reduced pressure and is condensed to form mineral-free water.

There have been many proposals in the past for solar stills, and these generally fall into two categories. There are the small portable types, often using inflatable plastic balloons or the like for use by shipwrecked personnel, but these are very limited in the amount of mineral-free water which can be obtained. The large permanent installations proposed heretofore use specially constructed, insulated pans of concrete, wood or metal covered by tight-fitting inclined glass panels. The inner surfaces of these pans are painted black to absorb heat from the sun's rays, and the insulation around the outside of the pans and underneath retains the heat so that a large portion of the heat is transferred into the water, causing it to evaporate and condense as distilled water on the underside of the inclined glass where it runs down and is collected in a suitable gutter. Among the difficulties with these prior permanent installations is the high cost of building and maintaining the large total areas of pans necessary. The glass panels are fragile and a relatively large continuous replacement is required because of breakage. Air leaks develop between the pans and the glass covers, markedly reducing the yield, and they need continuous repair. Also, a light-colored sediment is continuously deposited in the pans covering their black surfaces and thus reducing the yield. This sediment must be removed periodically by opening up the pans and scraping it away.

It is the object of the present invention to provide relatively large capacity for the generation of mineral-free water at a reasonable cost by utilizing solar energy while avoiding many of the drawbacks of the prior art.

Among the many advantages of the methods and apparatus of the present invention are those resulting from the fact that the cost of setting up a system and of maintaining it is relatively low. Moreover, these methods and apparatus enable the usage of many different types of naturally occurring shallow basins as a container for the water which is to be demineralized, such as ponds, lakes, inlets, bays, marshes, lagoons, slow moving streams, etc., and also enable the usage of relatively inexpensive man-made depressions, such as can be formed by a bulldozer. Also, each system is quickly and easily set up and placed in operation at any desired location where there is a suitable basin of water available or readily formed.

Further advantages of the present invention result from the fact that the apparatus itself is readily portable, for example, by mounting on a truck trailer. At any time the base of operations can be conveniently shifted from one basin of water to another without causing any loss in equipment and without undue increase in operating costs.

The dye or other coloring agent added to the water in the basin results in a greater efficiency because the heat of the solar radiation is absorbed in the body of the water instead of penetrating down to the bottom. As a result, transmission heat losses through the bottom are greatly reduced so as to provide the desired efficiencies without costly insulation of the bottom.

For purposes of impeding evaporation the surface of the water is covered with a stable liquid film or with a layer of finely divided solid or liquid material which is adapted to transmit the sun's energy into the body of the water. The heated water is conveyed into a flash chamber which operates at a partial vacuum. In this chamber a portion of the hot water flashes into water vapor and is passed into a condenser to form distilled water. The remaining water in the flash chamber is discharged to waste or a part or all of it may be returned to the basin to be reheated by the sun. Among the advantages of this evaporation barrier on the surface is its low cost, avoidance of any air leakage problems, and of course it is not subject to breakage. Whenever the water-purification operations are transferred to another site, the dye in the water and the surface barrier may be simply abandoned because they are relatively low in cost or can be recovered if desired. When not recovered, a new batch of each can be readily applied to the water at the new site. The present invention enables the users to obtain the desired large capacity without requiring any great initial investments in permanently fixed equipment while providing the many other operating advantages discussed above.

In this specification and in the accompanying drawings, are described and shown methods and apparatus embodying my invention for utilizing solar radiation to demineralize brackish water and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt it in various forms, each as may be best suited to the conditions of a particular system for demineralizing water.

The various objects, features, and advantages of the present invention will be more fully understood from a consideration of the following specification in conjunction with the accompanying drawings, in which:

FIGURE 1 is a perspective view, shown partially broken away in section illustrating the solar still method and apparatus of the present invention for utilizing solar energy to distill water from a shallow basin or pond containing seawater, brackish well water, or other water which is to be demineralized;

FIGURE 2 is a schematic illustration of the method and apparatus utilized in the system of FIGURE 1;

FIGURE 3 is a perspective view, shown partially broken away in section illustrating another embodiment of the solar still method and apparatus of the present invention utilizing salt water in an inlet from the sea which is dammed across the mouth; and FIGURE 4 is a schematic illustration of the method and apparatus of FIGURE 3.

As shown in FIGURE 1 there is a relatively large shallow basin 10 containing a body of water 12 which is to be demineralized. The basin as illustrated is a natural pond having a bottom 14 which is relatively impervious to water. To the water is added a dye coloring agent rendering the water relatively opaque to the sun's rays so that substantially all of the energy is absorbed in the body of the water without any substantial amount of the incident energy reaching the bottom, except at the shallowest places along the edge of the basin. This dye is added by opening a suitable discharge port in a container 16 such as a drum or barrel standing upon a box resting on the bottom near the shoreline so as to be readily accessible. The desired characteristics and concentrations for the dye and particular examples of suitable dyes are set forth further below.

In order to provide a barrier at the surface against loss of water or heat by evaporation, a layer of material 17 is applied to the surface of the water by opening a suitable port in a container 18 accessible from near the shoreline. In certain cases the containers 16 and 18 are carried upon a truck trailer 20 along with the other apparatus and are connected so as to feed into the basin through flexible hoses, as will be understood. The desired characteristics of this barrier layer 17 are described later on together with suitable examples of materials to use in forming this barrier.

In operation the sun's rays pass down through the surface barrier layer 17 without any substantial reduction in strength and are absorbed by the dyed water 12. This incident solar energy heats the upper portion of the water 12 which is near to or immediately adjacent to the barrier layer so as to raise the temperature of this upper portion of the water up into a temperature range significantly hotter than that which would normally exist. This heated brackish water is sucked up through an intake strainer 22 (please also see FIGURE 2) at the lower end of an intake duct 24 supported near the center of the basin 10 by means of a raft assembly 26, which is held in place by a suitable mooring line 27 and an anchor 28.

The depth of the intake strainer 22 beneath the surface 17 is vertically adjustable. As illustrated the raft assembly includes an annular float 29 having a platform 30 spanned across it with the intake duct 24 extending vertically down through a guide collar 23 near the center of the platform 30. This duct 24 is adjusted up and down by means of an adjusting wheel and clamp 25 engaging a rack 31 which is mounted vertically along one side of the duct 24. The optimum depth adjustment for the strainer 22 relative to the surface depends upon local conditions and upon the time of the day. For example, during the day the intake strainer 22 is carried at a level about six inches below the surface. At night, the intake 22 can be lowered down farther from the surface by releasing the clamp and turning the wheel 25 so as to lower the rack 31 and duct 24. This advantageous adjusted relationship between the intake 22 and the surface layer 17 is of course, maintained as the raft assembly rises and falls with any changes in the quantity of water in the basin. Also, it will be noted that the intake 22 is positioned generally near the center of the raft beneath its center of gravity and approximately centered with respect to the buoyant effort of the annular float 29. Thus, the intake 22 tends to remain at the desired distance beneath the surface in spite of any wave motion of the surface which might tend to rock the raft. As explained further below, any wave motion of the surface 17 may be minimized by applying certain surface tension reducing agents to the water in conjunction with the barrier layer 17.

In order to provide easy access for the hot water near the surface to reach the intake 22, it is preferred to have sufficient buoyancy in the float 29 such that the float does not sink down into the water as far as the intake 22. For example, the float 29 should not be below the four inch level when the intake 22 is at the six inch level. In cases where the float 29 is formed by a series of spaced members such as oil drums, then the intervening spaces provide access for the heated water to reach the intake 22 and the depth of the floats has correspondingly less effect.

The heated brackish water is conveyed through a flexible intake hose 32 supported by spaced floats 34 and running over to the remainder of the apparatus which is carried on the truck trailer 20. For convenience in illustration this part of the apparatus is shown in FIGURE 2 on a somewhat reduced scale relative to the raft assembly. As the heated brackish water passes through a valve 35 and enters the flash chamber 36, which is operated at a partial vacuum, a portion of this incoming water instantaneously boils or "flashes" into vapor which is drawn off through a very large diameter pipe 38 into a condenser 40 where it condenses as mineral-free water. It is important that this pipe 38 be as short as feasible and large in diameter so as to minimize the pressure drop of the vapor flowing therethrough.

In this example, the heated brackish water is conveyed directly into the flash chamber 36. It is contemplated that local conditions in certain installations may favor the use of a storage container for the heated brackish water into which it is conveyed from which it is conveyed at a later time into the flash chamber. For example, storage of the heated brackish water until nighttime may provide an increased differential in temperature between this heated water and the cooling water from the sea or other suitable source which is utilized to cool the condensing surfaces which are described below.

The flash chamber 36 is maintained under a partial vacuum at a pressure of approximately 1½ to 6 inches of mercury, absolute. That portion of the incoming brackish water which does not flash into vapor, of course, retains the mineral content and drops to the bottom of the flash chamber. It is withdrawn through a drain pipe 42 and through a valve 43 by means of a pump 44. A valve 46 and the associated pump 44 control the level 47 of the liquid in the bottom of the flash chamber 36 by means of a liquid level control mechanism 48 as indicated by the dashed control lines 50 and 51. The two valves 52 and 54 control the relative proportions of the liquid 47 which is returned to the basin through a line 55 or which is discharged through a waste line 56.

The condenser 40 is cooled by a suitable fluid medium, air or water, which is drawn in through an inlet duct or line schematically illustrated at 58. This cooling fluid is circulated by pump means 60 associated with the condenser and discharged through a line shown at 62. When water is used as the cooling medium for the condenser 40, it is of course, obtained at the lowest temperature, available, for example, from the lower depths of an adjacent large body of water or sea nearby. A portion of this cooling water, after usage in the condenser 40 can be used to make up for the hot water being continuously withdrawn from the basin by sending it through a valve 63 and make-up line 64 which is run from the return line 62 over to the pump 44.

The condensed water vapor runs down from the condenser coils 66 into a condensate receiver 68, and the demineralized water is fed out from the receiver 68 through a pump 70 and a valve 72 to a supply line 74. A level control mechanism 76 is arranged to maintain the desired level of condensate in the receiver 68 by controlling the pump 70 and valve 72 as indicated by the dashed control lines 78 and 79. In order to maintain the condenser 40 at peak efficiency, a vacuum pump or jet 69 continuously removes and discharges air and other non-condensible gases such as carbon dioxide which may enter the condenser along with the water vapor. The inflow to this chamber is controlled by the valve 35.

In order to produce the desired heat absorption and be suitable for use in this method and apparatus, the dye coloring agent should have the following desired characteristics and produce the following effects in use, and particular examples of suitable dyes are described in detail further below: The dye (a) renders brackish water relatively opaque to solar radiation at least over the range of frequencies containing the major portion of the incident energy; (b) is color fast; (c) is low in cost per gallon of brackish water treated; (d) is readily soluble in brackish water; (e) is non-poisonous in the concentrations existing in the basin. Also, the dye should either be (f) colorless and tasteless in the concentrations existing in the sea or other large body of water into which the unevaporated waste from the flash evaporator is discharged and also is colorless and tasteless in any concentration which appears in the distilled water itself or (g) be capable of being made colorless and tasteless by a relatively simple low cost treatment. For example, commercially available Naphthol Green "B" which can be obtained from General Dyestuff Corporation of Hudson Street, New York City, is satisfactory and is introduced to a concentration of 3 parts by weight per million parts by weight of water.

Another suitable dye and its preparation is disclosed in U.S. Patents Nos. 2,383,762 and 2,383,763.

Naphthol Green "B" is a disodium ferrous salt of nitroso-beta-naphthol sulfonic acid. As used herein the term "dark color" is intended to mean infra-red ray absorbing and does not necessarily mean that the dye has a dark appearance as seen with visible light.

The desired characteristics for the material used to form the surface barrier layer 17 are as follows, and a specific material for use is described later on: this material should (a) be non-volatile, (b) capable of floating or riding on brackish water, and (c) transparent to solar radiation at least over the range of frequencies containing the major portion of the incident energy. Also, this barrier material should be (d) low in cost, (e) not soluble or miscible in water or brine and (f) not combustible when spread out on the basin in the layer 17. In addition to the above, it is preferable that this barrier material be (g) opaque to infra-red radiation of long wave length such as is normally radiated from a body of water at a temperature less than the boiling point, and (h) have a low effective coefficient of heat transfer by conduction. It is also preferable that this barrier layer (i) act as a viscous damping medium so as to damp out any incipient wave motion by a viscous friction damping action. This viscous damping is not a necessary attribute of the barrier layer 17, because surface tension reducing agents or surfactants may be added to the layer 17 so as to produce the effect of wave diminution so as to stabilize the barrier layer, or the material of the layer may itself reduce the surface tension.

A suitable material for the layer 17 providing the desired characteristics is a mono-molecular layer of a long-chain alcohol, particular hexadecanol. A small percentage of stearyl alcohol added to the hexadecanol is desirable as it tends to increase the resistance of the layer to evaporation. One way in which to form the mono-molecular layer is to dump flakes of hexadecanol from the container 18 at the rate of 60 pounds per acre of water surface. An alternative and preferred way to apply the hexadecanol flakes is to spread them onto the surface of the water from several points spaced along near the bank such as those at 18 and 19 so as to be sure that the hexadecanol flakes are spread fairly uniformly. This establishes the layer 17, and then it is maintained by adding smaller batches of hexadecanol from the containers 18 and 19 or thrown onto the water from the shoreline.

The hexadecanol molecules in the mono-molecular layer 17 all align themselves with their hydrophylic ends down toward the body of the water and their hydrophobic ends up out of the surface, and as well as reducing evaporation to a great extent, they also reduce the surface tension of the brackish water.

Clean water has a surface tension of about 42 dynes per centimeter, and as the density of the layer 17 is increased the surface tension of the water 12 correspondingly decreases. The density of the layer 17 should be at least sufficient to reduce the surface tension by 10 dynes per centimeter. For convenience of expression, the difference between the surface tension of clean water and the actual surface tension with a substance applied to the surface of the water is called the "film pressure" of the particular substance added.

The maintenance of the barrier layer 17 is provided by a feed rate of about 15 pounds of flakes of hexadecanol per week per acre of basin surface, but it is increased after periods of high winds or when a reduction in the "film pressure" of the layer 17 below 10 dynes per centimeter indicates that the layer is dropping below the minimum density required to produce the desired optimum reduction in evaporation.

A way in which to test the "film pressure" of the hexadecanol layer 17 is to apply drops of an indicator mixture of dodecyl alcohol and light mineral oil to see if they are able to spread against the existing hexadecanol layer or not. This indicator mixture exhibits a "film pressure" which varies from 5 dynes per centimeter up to 42 dynes per centimeter as the percentage of dodecyl alcohol present is increased from 0.01% up to 100%, and the relationship is nearly logarithmic. For example, when 0.06% dodecyl alcohol is present in the testing mixture its "film pressure" is 10 dynes per centimeter, when .25% is present the "film pressure" is 15 dynes per centimeter, and when 1% is present its "film pressure" is 20 dynes per centimeter. The "film pressure" of the hexadecanol layer 17 is above that of any light oil-dodecyl alcohol mixture droplet which will not spread and is below that of any drop which does spread. By using a series of drops of varying ratio, the "film pressure" of the layer 17 is determined to the desired accuracy.

This use of hexadecanol and of the "film pressure" testing mixture of light mineral oil and dodecyl alcohol is described in the June 1957 issue of the Journal of the AWWA, pages 841–848, in a paper by Lloyd O. Timblin, Jr., Willis T. Moran, and Walter U. Garstka.

Instead of utilizing a liquid, a layer 17 of finely divided solid material, such as micro-balloons of polyethylene or polymethacrylate may be used to impede the evaporation of the water. These micro-balloons have the effect of mechanically interfering with evaporation from the water 12; whereas the mono-molecular layer of a long chain alcohol as discussed above has the effect of providing a finite energy step which must be overcome by any of the water molecules which escape from the surface. The mono-molecular layer is preferred to the mechanical barrier because the film is so thin that it requires a far smaller amount of material per acre of brackish water being treated to provide the desired reduction in evaporation.

Although the basin 10 has been described as a naturally occurring one, this is exemplary, for a suitable basin such as 10 may be scooped out by means of a bulldozer. When the soil is relatively porous so that substantial quantities of brackish water would be lost by leakage out through the bottom, then the bottom may be coated with clay or with an asphalt layer or Gunited concrete so as to seal up the pores in the earth.

In FIGURES 3 and 4 are illustrated another embodiment of the present invention, and parts of this system performing functions corresponding to those of similar parts of the system of FIGURES 1 and 2 have the same reference numerals. The basin 10 is an inlet from a sea 80 with a concrete dam 82 across its mouth. The water in the basin is especially treated to form the surface barrier layer 17 and is dyed so as to increase the absorption of solar energy. To form the inlet 22 for the heated brackish water, a horizontally elongated recess is formed in the face of the dam 82. This recess 22 extends horizontally for a substantial portion of the entire length of the dam and is about six inches in height, with its top surface positioned about six inches below the level of the barrier 17. Of course, the level of the sea rises and falls in tidal motion, but the level of the surface 17 may be maintained substantially constant by controlling the amounts of the return and make-up water which are added from time to time through the line 55.

In order to enable the operator to select the desired intake level, a series of vertically spaced inlet recesses 22′, 22″ are provided, each connected to the intake pipe 32 through a separate valve. Thus, the operator opens the valve corresponding to the desired intake depth position relative to the level of the surface 17.

The heated brackish water is drawn from the long recess 22 through an intake pipe 32 by means of an intake pump 33 and is fed through a valve 35 to a bank of spray headers 84 within the lower part of a flash condenser 86. This flash condenser is maintained at a partial vacuum of about 1½ to 6 inches of mercury, absolute. A vacuum pump 88, for example, a steam jet ejector or other suitable air removal device, continuously removes air and any other non-condensible gases which may be present. This flash condenser 86 includes a flash chamber generally indicated at 36 defined by the lower part of the tank 86 and by a pair of baffles 90. As the hot brackish water sprays from the headers 84 a part of it flashes into water vapor and rises up over the upper edges of the baffles 90 and comes into contact with banks of condenser tubes 92 within the condenser chambers 40 behind the baffles 90.

In order to cool these condenser tubes 92, cooling water is drawn in through an inlet line 58 by a pump 60 and is circulated through these tubes to a return line 62, then passing through a valve 65 and back through a sea discharge line 94. It will be noted that the intake end of the inlet line 58 is carried out a ways into the sea 80 by means of a series of concrete piers 96 so as to obtain as low a temperature as is available from the nearby sea. In some cases near the equator this temperature of sea water may be as high as 95° F., or higher, but the temperature of the dyed brackish water 12 will correspondingly be higher. When it is desired to add make up water to the basin 10, the value 65 is closed and the valve 63 is opened, feeding a portion of the return water through the make-up line 64 to the pump 44 and thus to the line 55. By using the valves 52 and 54 the operator controls the relative amounts of the brine 47 which is pumped into the line 55 or pumped through the waste line 56 over to the sea discharge line 94.

The distilled water is caught in a pair of channels 98 extending along opposite sides of the tank 86 and connected to the lower edges of the baffles 90 so as to form the lowest portion of the condenser chambers 40. From the channels 98 the pump 70 sends the demineralized water through the supply line 74 and up into a storage tank 100 ready for use.

In cases where the dye in the water 12 is such as to be carried over into the supply line 74 in appreciable quantities, then a dye removal or dye neutralizing stage 102 is included in this line 74.

As used herein the term "basin" is intended to include ponds, lakes, pools, inlets, bays, marshes, lagoons, slow moving streams, etc., and also man-made depressions. The term "dye" is intended to include any type of coloring agent having the desired characteristics as described in the specification. "Brackish water" is intended to include any type of water having too high a mineral content for the desired usage, and includes salt water having any degree of saltiness. The term "surface barrier layer" is intended to include any film of liquid or layer of finely divided solid or liquid particles or droplets for reducing evaporation.

From the foregoing specification it will be understood that the methods and apparatus of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and that in certain instances, some of the features of the invention may be used without a corresponding use of other features, all without departing from the scope of my invention.

I claim:

1. A system for providing demineralized water such as an open shallow basin in the earth from a source of brackish water and utilizing solar energy for heating the brackish water comprising, means for supplying hexadecanol for providing a barrier layer of hexadecanol floating on the brackish water in the basin for forming a layer of evaporation reducing material riding on the surface of the brackish water, means for mixing a heat-absorbing dye coloring agent with the brackish water in the basin for increasing the absorption directly in the dyed brackish water of incident solar energy, enclosure means defining a flash evaporation chamber, pump means communicating with the interior of the chamber for reducing the pressure therein substantially below atmospheric, float means, intake means carried by said float means for communicating with the heated brackish water in the basin at a small depth beneath said barrier layer and an intake line extending from said intake means to said chamber for feeding into said chamber, a condenser including fluid conduction cooling means and communicating with said flash evaporation chamber for condensing water vapor generated therein, and an outlet supply line from said condenser.

2. A system for distilling mineral-free water from brackish water using solar energy for heating comprising a shallow basin in the earth adjacent to a large body of brackish water, said basin being open to the atmosphere, means for flowing the brackish water into the basin, means for supplying a layer of hexadecanol (cetyl alcohol) onto the surface of the water in the basin, means for mixing Naphthol Green B (disodium ferrous salt of nitroso-beta-naphthol sulfonic acid) with the water in the basin, a flash condenser, pump means for maintaining a reduced pressure in the flash condenser, a float for floating on the brackish water in the basin, an intake duct mounted on the float, adjustment means for adjusting the vertical position of said intake duct with respect to said float, an intake line extending from the intake duct to the flash condenser, and cooling means in the flash condenser for condensing the water vapor therein.

3. A system for demineralizing brackish water contained in an open basin in the earth comprising, means for mixing a heat-absorbing dye in said water for absorbing heat from the sun's rays, means supplying and maintaining a barrier layer of evaporation-limiting material floating on the surface of said water, a float for floating on the surface of said water, a flash evaporator on the shore adjacent to said basin, an intake line connected to said flash evaporator for feeding the heated brackish water thereto, the intake end of said line being carried by said float and being positioned beneath said float at a level corresponding with a depth of about six inches beneath said surface, a condenser communicating with said evaporator, and a supply line from said condenser for supplying demineralized water.

4. A system for demineralizing brackish water contained in an open basin comprising means for mixing Naphthol Green B dye with the brackish water for absorbing heat from the sun's rays into the brackish water, means for applying and maintaining a layer of hexadecanol floating upon and covering the surface of the brackish water for limiting evaporation from the surface of the water into the atmosphere, a flash evaporator, an intake line for supplying the heated brackish water to said flash evaporator, a float for floating on the brackish water, the intake end of said line being mounted on said float for communicating with the brackish water in said basin at a depth approximately six inches beneath the layer of hexadecanol, and a condenser communicating with said evaporator for condensing demineralized water from the water vapor in the flash evaporator.

References Cited in the file of this patent

UNITED STATES PATENTS

| | | |
|---|---|---|
| 291,285 | Breese | Jan. 1, 1884 |
| 418,984 | Parks | Jan. 7, 1890 |
| 614,059 | Noble | Nov. 8, 1898 |
| 717,932 | Scudder | Jan. 6, 1903 |

(Other references on following page)

UNITED STATES PATENTS

| | | |
|---|---|---|
| 930,903 | Tucker | Aug. 10, 1909 |
| 1,109,550 | Schreiber | Sept. 1, 1914 |
| 1,153,953 | Rankin | Sept. 21, 1915 |
| 1,891,592 | Fitzgerald | Dec. 20, 1932 |
| 2,006,985 | Claude et al. | July 2, 1935 |
| 2,383,763 | Bloch et al. | Aug. 28, 1945 |
| 2,441,361 | Kirgan | May 11, 1948 |
| 2,636,129 | Agnew | Apr. 21, 1953 |

FOREIGN PATENTS

| | | |
|---|---|---|
| 8,318 | Great Britain | Apr. 14, 1908 |
| 28,130 | Great Britain | Dec. 17, 1908 |
| 424,663 | Italy | Aug. 28, 1947 |
| 838,722 | Germany | May 12, 1952 |

OTHER REFERENCES

Lineweaver: "Demineralization of Saline Waters," U.S. Dept. of Interior, October 1952 (page 9 relied upon).

Ellis: "Fresh Water From the Ocean," February 1, 1954, Ronald Press Company, New York (page 165 relied upon).

"Chemical Engineering Progress," vol. 54, No. 1, January 1958, pages 66–69.